3,450,745
ALKYL AND ARYL 4-(METHYLCARBAMOYLOXY) CARBANILATES
Linwood K. Payne, Jr., Charleston, W. Va., and Mathias H. J. Weiden, Raleigh, N.C., assignors to Union Carbide Corporation, a corporation of New York
No Drawing. Filed Jan. 18, 1966, Ser. No. 521,410
Int. Cl. C07c 79/16, 79/38, 153/00
U.S. Cl. 260—471
10 Claims

ABSTRACT OF THE DISCLOSURE

A series of new alkyl and aryl 4-(methylcarbamoyloxy) carbanilates have been found to be exceptionally active insecticides particularly against larval stages of lepidopterous pests. These compounds are effective systemic insecticides and possess desirable residual properties.

---

This invention relates to new chemical compounds useful as pesticides, particularly as systemic insecticides and as nematocides for the protection of crops.

Of the large number of commercial synthetic insecticides available today, relatively few exhibit systemic activity, that is, the ability to be absorbed by the vascular system of the plant to be protected and to be translocated to the parts of the plant attacked by insects. Once ingested by the insect, the systemic insecticide acts as a strong stomach poison and thus provides efficient insect control.

A major advantage inherent in the mode of action of a systemic insecticide and not shared by contact poisons is that beneficial insects which do not feed on the protected plants are not harmed by application of the systemic toxicant. In addition, systemic materials are generally not subject to loss of activity caused by weathering, e.g., heavy rain and strong sunlight, and, consequently, relatively few applications of the insecticide are required for long lasting insect control.

The compounds of this invention possess the major attributes of a systemic insecticide, viz., good systemic properties and high stomach toxicity, to an exceptional degree. Our materials are also relatively stable and provide long-lasting residual effectiveness, in distinction to other carbamate insecticides. In addition to having broad-spectrum activity against a wide variety of adult insects, the present materials provide outstanding control of their larval stages, particularly of lepidopterous pests.

The compounds of this invention are 4-(methylcarbamoyloxy)carbanilates which can be depicted structurally as follows:

(I)
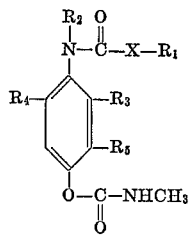

wherein $R_1$ represents lower alkyl, alkenyl, alkynyl, aralkyl, and aryl groups which can be substituted with halogen, nitro, lower alkoxy, lower alkyl, and the like; X is oxygen or sulfur; $R_2$ is hydrogen or lower alkyl containing not more than four carbon atoms; $R_3$ and $R_4$ individually are hydrogen or lower alkyl of up to about six carbon atoms; and $R_5$ can be hydrogen or halogen, especially chlorine or bromine, or lower alkyl, lower alkoxy, or lower alkylthio. $R_3$ and $R_5$ may optionally be linked together to form an alkylene chain containing from 3 to 5 carbon atoms.

We have found that, while all the compounds defined by general Formula I above, have activity as systemic insecticides, compounds in which $R_1$ is lower alkyl, especially methyl, and $R_2$ is hydrogen are preferred because of exceptional activity. If $R_1$ is an aromatic or aralkyl group, it should usually contain less than about 10 carbon atoms.

In addition, we have found that the total number of carbon atoms in $R_3$, $R_4$, and $R_5$ should not exceed about 7, and most preferred are compounds in which $R_5$ is hydrogen and the total number of carbon atoms in $R_3$ and $R_4$ is less than about 5.

As typical of the compounds embraced by Formula I there can be mentioned the following:

methyl 4-(methylcarbamoyloxy)carbanilate,
methyl 2-methyl-4-(methylcarbamoyloxy)carbanilate,
methyl 2,6-dimethyl-4-(methylcarbamoyloxy)carbanilate,
methyl 2,3,6-trimethyl-4-(methylcarbamoyloxy)carbanilate,
methyl 2-ethyl-4-(methylcarbamoyloxy)carbanilate,
methyl 2-n-propyl-4-(methylcarbamoyloxy)carbanilate,
methyl 2-isopropyl-4-(methylcarbamoyloxy)carbanilate,
methyl 2-sec. butyl-4-(methylcarbamoyloxy)carbanilate,
methyl 2-tert. butyl-4-(methylcarbamoyloxy)carbanilate,
methyl 2-methyl-6-ethyl-4-(methylcarbamoyloxy)carbanilate,
methyl 3-isopropyl-6-methyl-4-(methylcarbamoyloxy)carbanilate,
methyl 3-isopropyl-4-(methylcarbamoyloxy)carbanilate,
methyl 2,6-dimethyl-3-chloro-4-(methylcarbamoyloxy)carbanilate,
methyl 2,6-dimethyl-3-bromo-4-(methylcarbamoyloxy)carbanilate,
methyl 3-bromo-6-isopropyl-4-(methylcarbamoyloxy)carbanilate,
methyl 2,3-tetramethylene-4-(methylcarbamoyloxy)carbanilate, and the like, and ethyl (or n-propyl, or isopropyl, etc.) 2,6-dimethyl-4-(methylcarbamoyloxy)carbanilate,
ethoxyethyl 2,6-dimethyl-4-(methylcarbamoyloxy)carbanilate,
chloroethyl 2,6-dimethyl-4-(methylcarbamoyloxy)carbanilate,
nitroethyl 2,6-dimethyl-4-(methylcarbamoyloxy)carbanilate,
2-propenyl 2,6-dimethyl-4-(methylcarbamoyloxy)carbanilate,
2-methyl-2-propenyl 2,6-dimethyl-4-(methylcarbamoyloxy)carbanilate,
2-butenyl 2,6-dimethyl-4-(methylcarbamoyloxy)carbanilate,
propynyl 2,6-dimethyl-4-(methylcarbamoyloxy)carbanilate,
phenyl 2,6-dimethyl-4-(methylcarbamoyloxy)carbanilate,
4-chlorophenyl 2,6-dimethyl-4-(methylcarbamoyloxy)carbanilate,
4-chloro-2-methylphenyl 2,6-dimethyl-4-(methylcarbamoyloxy)carbanilate,
4-nitrophenyl 2,6-dimethyl-4-(methylcarbamoyloxy)carbanilate,
2,4-dichlorophenyl 2,6-dimethyl-4-(methylcarbamoyloxy)carbanilate,
benzyl 2,6-dimethyl-4-(methylcarbamoyloxy)carbanilate,
p-methylbenzyl 2,6-dimethyl-4-(methylcarbamoyloxy)carbanilate,
2,4-dimethylbenzyl 2,6-dimethyl-4-(methylcarbamoyloxy)carbanilate, 2,4-dichlorobenzyl 2,6-dimethyl-4-(methylcarbamoyloxy)carbanilate,
p-methoxybenzyl 2,6-dimethyl-4-(methylcarbamoyloxy)carbanilate,
α-methylbenzyl 2,6-dimethyl-4-(methylcarbamoyloxy)carbanilate,
1-(or 2-)naphthyl 2,6-dimethyl-4-(methylcarbamoyloxy)carbanilate,
1-tetralyl 2,6-dimethyl-4-(methylcarbamoyloxy)carbanilate, and the like, and methyl 2,6-dimethyl-4-(methylcarbamoyloxy)N-methylcarbanilate,
methyl 2,3-tetramethylene-4-(methylcarbamoyloxy)N-ethylcarbanilate, and the like, and the thiocarbanilate counterparts to the above-listed compounds, for example S-methyl 2,6-dimethyl-4-(methylcarbamoyloxy)thiolcarbanilate,
S-benzyl 2,6-dimethyl-4-(methylcarbamoyloxy)thiolcarbanilate,
S-phenyl 2,6-dimethyl-4-(methylcarbamoyloxy)thiolcarbanilate,
S-(4-methylphenyl) 2,6-dimethyl-4-(methylcarbamoyloxy)thiolcarbanilate,
S-(chlorophenyl)2,6-dimethyl-4-(methylcarbamoyloxy)thiolcarbanilate,
S-(1- or 2-naphthyl) 2,6-dimethyl-4-(methylcarbamoyloxy)thiolcarbanilate,
S-allyl 2,6-dimethyl-4-(methylcarbamoyloxy)thiolcarbanilate, and the like.

Similarly illustrative are ethyl (or n-propyl, or isopropyl, etc.)

2-isopropyl-4-(methylcarbamoyloxy)carbanilate,
ethoxyethyl 2-isopropyl-4-(methylcarbamoyloxy)carbanilate,
chloroethyl 2-isopropyl-4-(methylcarbamoyloxy)carbanilate,
nitroethyl 2-isopropyl-4-(methylcarbamoyoxy)carbanilate,
2-propenyl 2-isopropyl-4-(methylcarbamoyloxy)carbanilate,
2-methyl-2-propenyl 2-isopropyl-4-(methylcarbamoyloxy)carbanilate,
2-butenyl 2-isopropyl-4-(methylcarbamoyloxy)carbanilate,
propynyl 2-isopropyl-4-(methylcarbamoyloxy)carbanilate,
phenyl 2-isopropyl-4-(methylcarbamoyloxy)carbanilate,
4-chlorophenyl 2-isopropyl-4-(methylcarbamoyloxy)carbanilate,
4-chloro-2-methylphenyl 2-isopropyl-4-(methylcarbamoyloxy)carbanilate,
4-nitrophenyl 2-isopropyl-4-(methylcarbamoyloxy)carbanilate,
2,4-dichlorophenyl 2-isopropyl-4-(methylcarbamoyloxy)carbanilate,
benzyl 2-isopropyl-4-(methylcarbamoyloxy)carbanilate,
p-methylbenzyl 2-isopropyl-4-(methylcarbamoyloxy)carbanilate,
2,4-dimethylbenzyl 2-isopropyl-4-(methylcarbamoyloxy)carbanilate,
2,4-dichlorobenzyl 2-isopropyl-4-(methylcarbamoyloxy)carbanilate,
p-methoxybenzyl 2-isopropyl-4-(methylcarbamoyloxy)carbanilate,
α-methylbenzyl 2-isopropyl-4-(methylcarbamoyloxy)carbanilate,
1-(or 2-)naphthyl 2-isopropyl-4-(methylcarbamoyloxy)carbanilate,
1-tetralyl 2-isopropyl-4-(methylcarbamoyloxy)carbanilate, and the like, and methyl 2-isopropyl-4-(methylcarbamoyloxy)N-methylcarbanilate,
methyl 2-isopropyl-4-(methylcarbamoyloxy)N-ethylcarbanilate, and the like, and the thiocarbanilate counterparts to the above-listed compounds, for example S-methyl 2-isopropyl-4-(methylcarbamoyloxy)thiolcarbanilate,
S-benzyl 2-isopropyl-4-(methylcarbamoyloxy)thiolcarbanilate,
S-phenyl 2-isopropyl-4-(methylcarbamoyloxy)thiolcarbanilate,
S-(4-methylphenyl) 2-isopropyl-4-(methylcarbamoyloxy)thiolcarbanilate,
S-(chlorophenyl) 2-isopropyl-4-(methylcarbamoyloxy)thiolcarbanilate,
S-(1- or 2-naphthyl) 2-isopropyl-4-(methylcarbamoyloxy)thiolcarbanilate,
S-allyl 2-isopropyl-4-(methylcarbamoyloxy)thiolcarbanilate, and the like.

The compounds of our invention can be synthesized from the corresponding 4-hydroxycarbanilate compounds according to the following reaction:

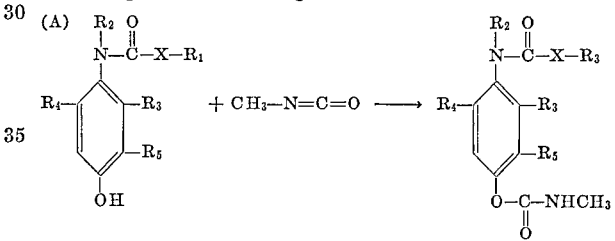

(A)

(II)   (III)   (I)

wherein $R_1$, $R_2$, $R_3$, $R_4$, $R_5$, and X are defined as above. Methods for synthesizing 4-hydroxycarbanilate compounds have been described previously in publications reviewed by Matzner et al., Chem. Rev., 64, No. 6, 663 (1964). The corresponding aminophenols are readily prepared by the method of J. R. Stevens and R. H. Beutel, J. Am. Chem. Soc., 63, 308 (1941).

The 4-hydroxycarbanilate compounds (II) are themselves prepared from the corresponding aminophenol compounds by reaction with the appropriate chloroformate

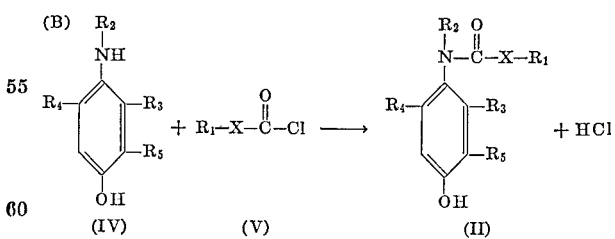

(B)

(IV)   (V)   (II)

Reaction (A), above, is effected by dissolving one equivalent of the hydroxycarbanilate compound (II) in a suitable solvent, such as acetone, and reacting the solution with at least one equivalent of methyl isocyanate, in the presence of an effective amount of a suitable catalyst, such as a lower tertiary alkyl amine or an organotin salt. The reaction can be carried out at temperatures of from about 10° C. to 125° C., preferably between 30° C. and 80° C. The molar excess of methyl isocyanate can be up to 10:1 but no advantages are gained by using ratios of more than 1.2:1. The amount of catalyst typically required is from about 0.1 to about 2 percent by weight based on starting carbanilate (II). The reaction is conveniently carried out at atmospheric pressure, but pressures from 1 to 10 atmospheres can be employed. The reaction is usually complete after about two hours to a day, depending on the reaction temperature used. The reaction product is recovered in conventional ways, e.g., by removing the volatile components of the reaction mixture in vacuo and purifying the residue by recrystallization.

The following examples are illustrative:

EXAMPLE I

Preparation of methyl 2,6-dimethyl-4-(methylcarbamoyloxy)carbanilate (A) 4-amino-3,5-xylenol.—Five moles (956 grams) of sulfanilic acid and 2.5 moles (265 grams) of anhydrous sodium carbonate were dissolved in 5 liters of water. This solution was cooled to 15° C. and sodium nitrate (370 grams; 5.4 moles) dissolved in one liter of water was added. To a stirred reactor was charged 4.5 kilograms of crushed ice and 1060 grams of concentrated hydrochloric acid. The solution of the sulfanilic acid was then slowly added to the hydrochloric acid keeping the reaction temperature at about 15° C. The mixture was stirred for twenty-five minutes after the addition was completed and the temperature was maintained at 10 to 15° C. The resulting slurry of diazotized sulfanilic acid was transferred to two Erlenmyer flasks and the reactor charged with 3,5-xylenol (610 grams; 5 moles) dissolved in aqueous sodium hydroxide (1100 grams; 27.5 moles in 4500 grams of water). After cooling the xylenol solution to 5° C., the diazotized sulfanilic acid slurry was added with stirring over a period of one hour. The reaction temperature was maintained at 4–8° C. during the addition. After the addition was complete, the reaction mixture was stirred at this temperature for an additional ninety minutes. The resulting dark red solution was heated to 50° C. and 230 grams of sodium hydrosulfite added slowly. The solution was stirred for ten minutes and then, while heating, 2070 grams of soduim hydrosulfite was added over a fifteen minute period. The solution was finally heated to 80° C. and after twenty-five minutes at this temperature the red color faded rapidly and the tan solid amine precipitated. At this time the reaction temperature rose to 90° C. and subsided without external cooling. The mixture was stirred at 80–90° C. for twenty minutes, cooled to room temperature and the solid collected by filtration and dried. The 4-amino-3,5-xylenol weighed 685 grams (100 percent yield) and melted at 175–180° C.

(B) Methyl 2,6 - dimethyl - 4 - hydroxycarbanilate.—Amino-3,5-xylenol (655 grams; 4.76 moles), obtained as described in Step A, above, was dissolved in 5.5 liters of dry acetone containing 448 grams (5.34 moles) of sodium bicarbonate. To this slurry was added methyl chloroformate (463 grams; 4.87 moles) over a twenty-five minute period while stirring. The reaction temperature rose to 42° C. during the addition. An inorganic precipitate was removed by filtration and the acetone stripped from the carbanilate solution under reduced pressure over a 50° C. water bath. The resulting solid weighed 830 grams (89 percent yield) and melted at 155° C.

(C) Methyl 2,6-dimethyl-4-(methylcarbamoyloxy)carbanilate.—The methyl 2,6-dimethyl-4- hydroxycarbanilate (789 grams; 4 moles) obtained in Step B, above, was dissolved in 3 liters of dry acetone, one gram of triethylene diamine catalyst was added, and the resulting solution allowed to react with methyl isocyanate (245 grams; 4.3 moles), which had been dissolved in 200 milliliters of acetone, added over a ninety minute period. The resulting solution was heated at 50° C. for eight hours and allowed to stand overnight. The acetone was stripped from the product under reduced pressure until almost dry. The resulting solid was slurried in ethyl ether, collected by filtration, and dried to afford 893 grams of the title compound; melting point 174–176° C. An additional 25 grams was obtained by concentration of the ether filtrate; melting point 171–175° C. The total production of 918 grams was equivalent to a 91 percent yield.

EXAMPLE II

Preparation of methyl 2-isopropyl-4-(methylcarbamoyloxy)carbanilate (A) 4-amino-3-isopropylphenol.—This phenol was obtained in 81 percent yield using the procedure described by Gilman et al., J. Org. Chem., 19, 1067 (1954). The product had a melting point of 172–175° C.

(B) Methyl 4-hydroxy-2 - isopropylcarbanilate.—The reaction of 4-amino-3-isopropylphenol with methyl chloroformate in acetone solution, using sodium bicarbonate as an acid acceptor, resulted in a 85 percent yield of the title carbanilate; melting point 140° C. (purified by washing with benzene).

(C) Methyl 2-isopropyl-4 - (methylcarbamoyloxy)carbanilate.—This product was obtained in quantitative yield by the reaction of the phenol with methyl isocyanate as described in Example I(C). The product was purified by recrystalling from isopropyl alcohol to a melting point of 132–134° C.

EXAMPLE III

Methyl 2,3-tetramethylene-4-(methylcarbamoyloxy) carbanilate (A) 5,6,7,8-tetrahydro - 1 - naphthol (59 grams; 0.5 moles) dissolved in 350 milliliters of isopropyl alcohol was treated slowly with 167 milliliters (2.0 mole) of concentrated hydrochloric acid while stirring at 0° C. The resulting solution was then treated with a solution of 30 grams (0.44 mole) of sodium nitrite in 100 milliliters of water. The addition was conducted over a period of one hour and the well-stirred mixture maintained at 0° C. with the aid of an ice bath. One-half hour after the sodium nitrite feed was completed the reaction mixture was poured into two liters of iced water. A light brown solid precipitated and was collected by filtration. After washing thoroughly with water and drying, the solid melted at 150° C. Recrystallization from ethanol raised the melting point to 159–160° C. Further recrystallization from xylene increased it to 167–168° C. The yield was 40 grams.

Analysis.—Calculated for $C_{10}H_{11}NO_2$ (percent): C, 67.8; H, 6.3; N, 7.9. Found (percent): C, 68.0; H, 6.4; N, 8.1.

(B) Twenty-five grams of 5,6,7,8 - tetrahydro - 1,4-naphthoquinone monoxime was dissolved in 250 milliliters of isopropyl alcohol, 7 grams of Raney nickel catalyst added and the mixture hydrogenated at 40–50 p.s.i.g. After forty-five minutes hydrogen uptake was complete. The catalyst was removed by filtration, the solvent evaporated and the residue recrystallized from toluene. There was obtained 15 grams of 4-amino-5,6,7,8-tetrahydro-1-naphthol having a melting point of 144–146° C.

Analysis.—Calculated for $C_{10}H_{13}NO$ (percent): C, 73.6; H, 8.0; N, 8.6. Found (percent): C, 73.5; H, 8.1; N, 8.5.

(C) 4-amino-5,6,7,8-tetrahydro-1-naphthol (25 grams; 0.153 moles) dissolved in 250 milliliters of dioxane was treated dropwise at 35° C. with methyl chloroformate (7.3 grams; 0.077 mole). The mixture was stirred at 35° C. for one hour after the addition was complete, filtered and the solvent evaporated from the filtrate in vacuo. The residue was recrystallized from toluene to afford 14 grams of methyl 4-hydroxy-2,3-tetramethylene cabanilate which had a melting point of 151–153° C.

Analysis.—Calculated for $C_{12}H_{15}NO_3$ (percent): C, 65.1; H, 6.8; N, 6.3. Found (percent): C, 65.1; H, 6.9; N, 6.3.

(D) Methyl 4-hydroxy-2,3-tetramethylene carbanilate (11 grams; 0.05 mole) was dissolved in 200 milliliters of acetone and treated with methyl isocyanate (3 grams; 0.055 mole) of a catalytic amount of tertiary amine catalyst for three days at room temperature. The solvent was stripped from the product under reduced pressure and the residue recdystallized from toluene. There was obtained 6 grams of methyl 4-(methylcarbamoyloxy)-2,3-tetramethylene carbanilate having a melting point of 142–144° C.

*Analysis.*—Calculated for $C_{14}H_{18}N_2O_4$ (percent): C, 60.4; H, 6.5; N, 10.1. Found (percent): C, 59.5; H, 6.7; N, 10.3.

EXAMPLE IV

Phenyl 2,6-dimethyl-4-(methylcarbamoyloxy) carbanilate (A) 4 - amino-3,5 - dimethylphenol (11 grams; 0.08 mole) was dissolved in 200 milliliters of anhydrous acetone and 8.4 grams (0.1 mole) of sodium bicarbonate added. The mixture was stirred and heated at 40° C. while phenyl chloroformate (12.5 grams; 0.08 mole) was added dropwise. The mixture was stirred at 40° C. for an additional hour and filtered. A solid product was obtained upon evaporation of the solvent which, upon recrystallization from aqueous isopropyl alcohol, had a melting point of 187–188° C.

*Analysis.*—Calculated for $C_{15}H_{15}NO_3$ (percent): C, 70.0; H, 5.9; N, 18.7. Found (percent): C, 69.9; H, 5.8; N, 18.8.

(B) The phenol prepared in A above, was allowed to react with methyl isocyanate in acetone solution, using dibutyltin diacetate as a catalyst for three days at 25–30° C. The product crystallized upon evaporation of the solvent and, after purification by recrystallization from toluene, had a melting point of 175–177° C.

*Analysis.*—Calculated for $C_{17}H_{18}N_2O_4$ (percent): C, 65.0; H, 5.8; N, 20.4. Found (percent): C, 64.7; H, 5.7; N, 20.1.

EXAMPLE V

α-Methylbenzyl 2,6-dimethyl-4-(methylcarbamoyloxy) carbanilate

Ten grams of α-methylbenzyl 4-hydroxy-2,6-dimethylcarbanilate, obtained from the reaction of 4-amino-3,5-dimethylphenol with α-methylbenzylchloroformate in the presence of sodium bicarbonate, was treated with five grams of methyl isocyanate in 100 milliliters of dry acetone. Three drops of triethylamine were employed as a catalyst and the mixture was allowed to stand at room temperature for two days with occasional agitation. The volatile components were stripped from the mixture and the solid product purified by washing thoroughly with acetone. The purified product had a melting point of 197–199° C. and the following analysis.

*Analysis.*—Calculated for $C_{19}H_{22}N_2O_4$ (percent): C, 66.7; H, 6.5; O, 18.7. Found (percent): C, 66.4; H, 6.6; N, 18.9.

EXAMPLE VI

S-methyl 2,6-dimethyl-4-(methylcarbamoyloxy) thiocarbanilate

S-methyl 4-hydroxy-2,6-dimethylcarbanilate (8 grams; 0.038 mole), obtained by the reaction of 4-amino-3,5-dimethylphenol with methylthiol chloroformate, was dissolved in 100 milliliters of anhydrous acetone and treated with 3 grams of methyl isocyanate and 2 drops of triethylamine. After two days at room temperature, a precipitate had formed which was collected by filtration and washed thoroughly with cold acetone to afford 5 grams of the product having a melting point of 204–206° C.

EXAMPLE VII

Methyl 2-isopropyl-4-(methylcarbamoyloxy) n-ethylcarbanilate (A) 4-amino-3-isopropylphenol (15 grams) dissolved in 80 milliliters of 50% anhydrous ethanol was heated to 50° C. and treated with 9 grams of acetaldehyde. The mixture was stirred at 50° C. for five minutes and then treated with 200 grams of crushed ice. An oil separated which was collected by ether extraction. The ether solution was washed thoroughly with water and the ether was evaporated. The residue was dissolved in alcohol, 5 grams of Raney nickel catalyst added and the mixture hydrogenated at 25–40 p.s.i. The catalyst was removed by filtration and the solvent evaporated to afford 12 grams of 3-isopropyl-4-ethylaminophenol having a melting point of 52–58° C.

(B) The 3-isopropyl-4-ethylaminophenol, without further purification, was allowed to react with methyl chloroformate in the presence of sodium bicarbonate. The resulting methyl N-ethyl-4-hydroxy-2-isopropylcarbanilate (14 grams) was taken as a residue product and had a melting point of 42–47° C.

(C) Reaction of methyl N-ethyl-4-hydroxy-2-isopropylcarbanilate (14 grams) with 10 grams of methyl isocyanate in 70 milliliters of anhydrous acetone, using 4 drops of triethylamine catalyst, was allowed to proceed for four days at room temperature. The solvent was then evaporated under reduced pressure and the resulting reddish solid dissolved in ethyl ether. The ether solution was washed thoroughly with water, dried and the ether evaporated. There was obtained 12 grams of methyl 2-isopropyl-4-(methylcarbamoyloxy)N-ethylcarbanilate as a sticky oil.

*Analysis.*—Calculated for $C_{15}H_{22}N_2O_4$ (percent): C, 61.2; H, 7.5; N, 21.7. Found (percent): C, 61.7; H, 7.6; N, 21.2.

The following compounds, illustrative of those encompassed by this invention, were tested with regard to their pesticidal activity.

These compounds are generally soluble in methyl alcohol, acetonitrile, dioxane or dimethylformamide and can generally be recrystallized from toluene or xylene. Structures were supported by infrared and nuclear magnetic resonance spectroscopy.

Compound 1

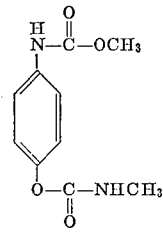

Methyl 4-(methylcarbamoyloxy)carbanilate, M.P. 153–155° C.

*Analysis.*—Calculated (percent): C, 53.6; H, 5.4; N, 12.5. Found (percent): C, 53.4; H, 5.6; N, 12.5.

Compound 2

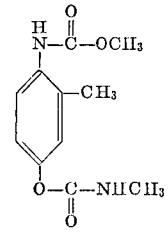

Methyl 2-methyl-4-(methylcarbamoyloxy)carbanilate, M.P. 139–142° C.

*Analysis.*—Calculated (percent): C, 55.5; H, 5.9; N, 11.8. Found (percent): C, 55.5; H, 6.1; N, 11.8.

Compound 3

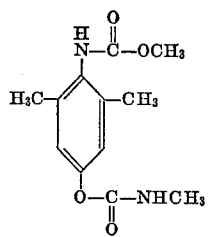

Methyl 2,6-dimethyl-4-(methylcarbamoyloxy)carbanilate, M.P. 175–178° C.

*Analysis.*—Calculated (percent): C, 57.1; H, 6.4; N, 11.1. Found (percent): C, 57.0; H, 6.6; N, 11.1.

Compound 4

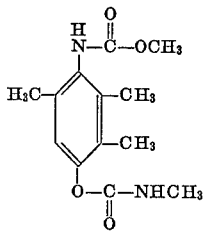

Methyl 2,3,6-trimethyl 4-(methylcarbamoyloxy)carbanilate, M.P. 196–198° C.

*Analysis.*—Calculated (percent): C, 58.6; H, 6.8; O, 24.0. Found (percent): C, 58.9; H, 6.8; O, 24.3.

Compound 5

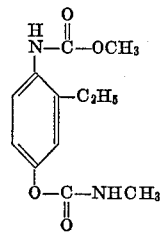

Methyl 2 - ethyl - 4-(methylcarbamoyloxy)carbanilate, M.P. 98–100° C.

*Analysis.*—Calculated (percent): C, 57.1; H, 6.4; O, 25.4. Found (percent): C, 56.8; H, 6.4; O, 25.8.

Compound 6

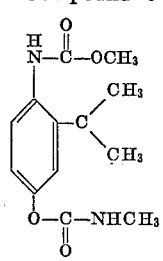

Methyl 2 - isopropyl-4-(methylcarbamoyloxy)carbanilate, M.P. 132–134° C.

*Analysis.*—Calculated (percent): C, 58.6; H, 6.8; N, 10.5. Found (percent): C, 58.6; H, 6.9; N, 10.4.

Compound 7

Methyl 2-sec.butyl-4-(methylcarbamoyloxy)carbanilate, M.P. 134–136° C.

*Analysis.*—Calculated (percent): C, 60.0; H, 7.2; O, 22.8. Found (percent): C, 59.4; H, 7.3; O, 22.8.

Compound 8

Methyl 2 - tert.butyl-4-(methylcarbamoyloxy)carbanilate, M.P. 133–136° C.

*Analysis.*—Calculated (percent): C, 60.0; H, 7.2; O, 22.8. Found (percent): C, 60.3; H, 7.3; O, 23.0.

Compound 9

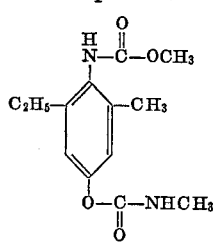

Methyl 2 - methyl-6-ethyl-4-(methylcarbamoyloxy)carbanilate, M.P. 160–161° C.

*Analysis.*—Calculated (percent): C, 58.6; H, 6.8; O, 24.0. Found (percent): C, 58.6; H, 6.9; O, 24.4.

Compound 10

Methyl 2-methyl-6-isopropyl-4-(methylcarbamoyloxy)carbanilate, M.P. 160–163° C.

*Analysis.*—Calculated (percent): C, 60.0; H, 7.2; O, 22.8. Found (percent): C, 59.9; H, 7.4; O, 23.0.

Compound 11

Methyl 2-methyl-6-tert.butyl-4-(methylcarbamoyloxy)carbanilate, M.P. 167–169° C.

*Analysis.*—Calculated (percent): C, 61.2; H, 7.5; O, 21.7. Found (percent): C, 61.0; H, 7.7; O, 21.9.

Compound 12

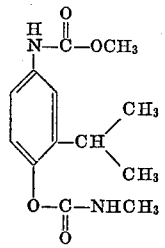

Methyl 3 - isopropyl-4-(methylcarbamoyloxy)carbanilate, M.P. 138–139° C.

*Analysis.*—Calculated (percent): C, 58.6; H, 6.8; O, 24.0. Found (percent): C, 59.0; H, 7.0; O, 24.5.

Compound 13

Methyl 3-isopropoxy-4-(methylcarbamoyloxy)carbanilate, M.P. 126–129° C.

*Analysis.*—Calculated (percent): C, 55.3; H, 6.4; O, 28.3. Found (percent): C, 55.2; H, 6.6; O, 28.3.

Compound 14

Methyl 3 - n-propylthio-4-(methylcarbamoyloxy)carbanilate, M.P. 60–62° C.

*Analysis.*—Calculated (percent): C, 52.3; H, 6.1; O, 21.5. Found (percent): C, 52.3; H, 6.1; O, 21.4.

Compound 15

Methyl 3-isopropyl-6-methyl-4-(methylcarbamoyloxy)carbanilate, M.P. 167–168° C.

*Analysis.*—Calculated (percent): C, 60.0; H, 7.2; O, 22.8. Found (percent): C, 60.2; H, 7.3; O, 23.2.

Compound 16

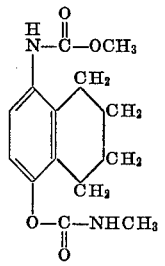

Methyl 2,3 - tetramethylene - 4-(methylcarbamoyloxy)carbanilate, M.P. 142–144° C.

Compound 17

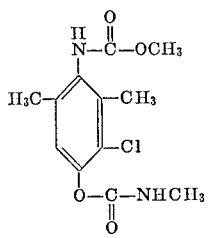

Methyl 3-chloro-2,6-dimethyl-4-(methylcarbamoyloxy)carbanilate, M.P. 205–207° C.

*Analysis.*—Calculated (percent): C, 50.3; H, 5.3; O, 22.3. Found (percent): C, 50.3; H, 5.6; O, 22.3.

Compound 18

Methyl 3-bromo-2,6-dimethyl-4-(methylcarbamoyloxy)carbanilate, M.P. 211–213° C.

*Analysis.*—Calculated (percent): C, 43.5; H, 4.6; O, 19.3. Found (percent): C, 43.1; H, 4.5; O, 19.3.

Compound 19

Methyl 3-bromo-6-isopropyl-4-(methylcarbamoyloxy)-carbanilate, M.P. 172–174° C.

*Analysis.*—Calculated (percent): C, 45.2; H, 5.0; O, 18.5. Found (percent): C, 44.9; H, 5.0; O, 18.7.

Compound 20

Ethyl 2,6-dimethyl-4-(methylcarbamoyloxy)carbanilate, M.P. 174–176° C.

*Analysis.*—Calculated (percent): C, 58.6; H, 6.8; O, 24.0. Found (percent): C, 58.6; H, 6.8; O, 24.1.

Compound 21

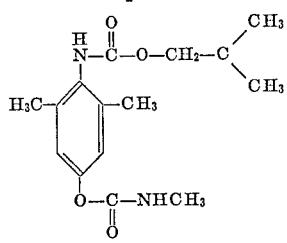

Isobutyl 2,6-dimethyl-4-(methylcarbamoyloxy)carbanilate, M.P. 165–167° C.

*Analysis.*—Calculated (percent): C, 61.2; H, 7.5; O, 21.7. Found (percent): C, 61.2; H, 7.6; O, 21.7.

Compound 22

2-chloroethyl 2,6-dimethyl-4-(methylcarbamoyloxy)-carbanilate, M.P. 160–161° C.

*Analysis.*—Calculated (percent): C, 51.9; H, 5.7; O, 21.3. Found (percent): C, 51.4; H, 5.7; O, 21.0.

Compound 23

2-ethoxyethyl 2,6-dimethyl-4-(methylcarbamoyloxy)-carbanilate, M.P. 103–104° C.

*Analysis.*—Calculated (percent): C, 58.1; H, 7.1; O, 25.8. Found (percent): C, 57.5; H, 7.2; O, 25.3.

Compound 24

2-propenyl 2,6-dimethyl-4-(methylcarbamoyloxy)carbanilate, M.P. 164–166° C.

*Analysis.*—Calculated (percent): C, 60.4; H, 6.5; O, 23.0. Found (percent): C, 60.3; H, 6.6; O, 23.0.

Compound 25

Propargyl 2,6-dimethyl-4-(methylcarbamoyloxy)carbanilate, M.P. 157–158° C.

*Analysis.*—Calculated (percent): C, 60.4; H, 6.5; N, 10.1. Found (percent): C, 59.9; H, 6.7; N, 10.3.

Compound 26

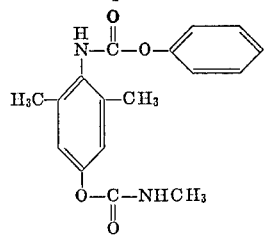

Phenyl 2,6-dimethyl-4-(methylcarbamoyloxy)carbanilate, M.P. 175–177° C.

*Analysis.*—Calculated (percent): C, 65.0; H, 5.8; O, 20.4. Found (percent): C, 64.7; H, 5.7; O, 20.1.

Compound 27

4-chlorophenyl 2,6-dimethyl-4-(methylcarbamoyloxy)-carbanilate, M.P. 180–182° C.

*Analysis.*—Calculated (percent): C, 58.5; H, 4.9; O, 18.4. Found (percent): C, 58.2; H, 4.9; O, 18.6.

Compound 28

4-nitrophenyl 2,6-dimethyl-4-(methylcarbamoyloxy)-carbanilate, M.P. 164–165° C.

Compound 29

S-phenyl 2,6-dimethyl-4-(methylcarbamoyloxy)thiolcarbanilate, M.P. 205–206° C.

*Analysis.*—Calculated (percent): C, 61.8; H, 5.5; O, 14.5. Found (percent): C, 61.6; H, 5.5; O, 14.7.

Compound 30

Benzyl 2,6-dimethyl-4-(methylcarbamoyloxy)carbanilate, M.P. 158–160° C.

*Analysis.*—Calculated (percent): C, 65.8; H, 6.1. Found (percent): C, 65.9; H, 6.3.

Compound 31

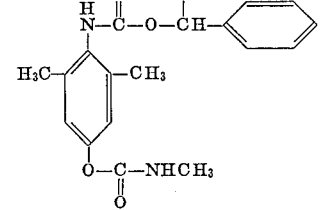

α-methylbenzyl 2,6-dimethyl-4-(methylcarbamoyloxy)-carbanilate, M.P. 197–199° C.

*Analysis.*—Calculated (percent): C, 66.7; H, 6.5; O, 18.7. Found (percent): C, 66.4; H, 6.6; O, 18.9.

Compound 32

3,4-dichlorobenzyl 2,6-dimethyl-4-(methylcarbamoyloxy)carbanilate, M.P. 187–189° C.

*Analysis.*—Calculated (percent): C, 54.4; H, 4.6; O, 16.1. Found (percent): C, 54.7; H, 4.6; O, 16.2.

Compound 33

S-methyl 2,6-dimethyl-4-(methylcarbamoyloxy)thiolcarbanilate, M.P. 204–206° C.

*Analysis.*—Calculated (percent): C, 53.7; H, 6.0; O, 17.9. Found (percent): C, 53.8; H, 6.0; O, 18.0.

Compound 34

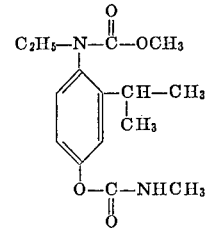

Methyl 2-isopropyl-4-(methylcarbamoyloxy)N-ethylcarbanilate, (residual oil).

*Analysis.*—Calculated (percent): C, 61.2; H, 7.5; O, 21.7. Found (percent): C, 61.7; H, 7.6; O, 21.2.

Compound 35

Methyl 2,3-tetramethylene-4-(methylcarbamoyloxy)N-ethylcarbanilate, M.P. 44–50° C.

*Analysis.*—Calculated (percent): C, 62.7; H, 7.2; O, 20.9. Found (percent): C, 62.0; H, 7.6; O, 21.5.

These compounds were evaluated with respect to their contact and systemic activity against representative insects, viz., aphid, armyworm, Mexican bean beetle, and housefly, by the following standard procedures. In addition, the utility of our compounds as nematocides was assessed by a standard nematocide test.

Suspensions of the test compounds were prepared by dissolving one gram of compound in 50 milliliters of acetone in which had been dissolved in 0.1 gram (10 percent of the weight of compound) of an alkylphenoxy polyethoxyethanol surfactant, as an emulsifying or dispersing agent. The resulting solution was mixed into 150 milliliters of water to give roughly 200 milliliters of a suspension containing the compound in finely divided form. The thus-prepared stock suspension contained 0.5 percent by weight of compound. The test concentrations employed in the tests described hereinbelow were obtained by diluting the stock suspension with water. Serial dilution tests were carried out in the indicated instances to determine the $LD_{50}$ (concentration of chemical required to kill fifty percent of the insect population) values for each test compound. The test procedures were as follows:

Southern armyworm leaf dip test

Larvae of the southern armyworm (*Prodenia eridania*, (Cram.)), reared on Tendergreen bean plants at a temperature of 80±5° F. and a relative humidity of 50±5 percent, constituted the test insects. The test compounds were formulated by diluting the stock suspension with water to give a suspension containing 500 parts of test compound per million parts of final formulation (by weight). Paired seed leaves, excised from Tendergreen bean plants, were dipped in the test formulations until thoroughly wetted, excess liquid being removed by gentle shaking. While the leaves were drying in a ventilated hood, wilting was prevented by placing the stems in water. When dry, the paired leaves were separated and each one was placed in a 9-centimeter Petri dish lined with moistened filter paper. Five randomly selected larvae were introduced into each dish and the dishes were closed. The closed dishes were labeled and held at 80–85° F. for three days. Although the larvae could easily consume the whole leaf within twenty-four hours, no more food was added. Larvae which were unable to move the length of the body, even upon stimulation by prodding, were considered dead. Percent mortality was recorded for various concentration levels.

Southern armyworm systemic test

Larvae of the southern armyworm (*Prodenia eridania* (Cram.)), reared on Tendergreen bean plants at a temperature of 80±5° F. and a relative humidity of 50±5 percent, constituted the test insects. The test compounds were formulated by diluting the stock suspension with water to give final dilutions of 250 and 50 p.p.m.

Two Tendergreen bean plants in the primary leaf stage and 6 to 8 inches in height, growing in a two-and-a-half inch clay pot, or two Coker 100 cotton seedlings in the cotyledon leaf stage growing in three-and-a-half inch clay pots were placed in 4-ounce or 8-ounce paper containers respectively. Twenty milliliters of the test formulations were drenched into the pots containing the bean plants or 25 milliliters into the pots containing the cotton plants. As a control, a similar volume of a water-acetone-emulsifier solution containing no test compound was drenched into another pot with plants. After holding the treated plants for 48 hours at 80±5° F. and 50±5 percent relative humidity, one leaf was excised from each plant and each leaf placed in a labeled 9-centimeter Petri dish lined with moistened filter paper. Five randomly selected larvae were introduced into each dish and the dishes were closed and held at 80±5° F. for three days. Although the larvae could easily consume the whole leaf within 24 hours, no more food was added. Larvae which were unable to move the length of the body, even upon stimulation by prodding, were considered dead. Percent mortality was recorded for both levels.

Southern armyworm residual test

Larvae of the southern armyworm (*Prodenia eridania* (Cram.)), reared on Tendergreen bean plants at a temperature of 80±5° F. and a relative humidity of 50±5 percent, constituted the test insects. The test compounds were formulated by diluting the stock suspension with water to give a final dilution of 30 p.p.m.

Two pots with two Tendergreen bean plants in the primary leaf stage and 6 to 8 inches in height, growing in a two-and-a-half inch clay pot were placed on a revolving turntable and sprayed with 100 milliliters of test compound formulation by use of a DeVilbiss spray gun set at 40 p.s.i.g. air pressure. This application which lasted 30 seconds was sufficient to wet the plants to runoff. As a control, 100 to 110 milliliters of a water-acetone-emulsifier solution containing no test compound were also sprayed onto bean plants. The sprayed plants were allowed to dry. Then one leaf was excised from each plant in one pot for immediate bioassay and one leaf from each plant of the second pot was sampled after a holding period of one week at 80±5° F. and 50±5 percent relative humidity. Each excised leaf was placed in a labeled 9-centimeter Petri dish lined with moistened filter paper. Five randomly selected larvae were introduced into each dish and the dishes were closed and held at 80±5° F. for three days. Although the larvae could easily consume the whole leaf within 24 hours, no more food was added. Larvae which were unable to move the length of the body, even upon stimulation by prodding, were considered dead and the percent mortality was recorded.

Mexacina bean beetle leaf dip test

Third instar larvae of the Mexican bean beetle (*Epilachna varivestis*, Muls.), reared on Tendergreen bean plants at a temperature of 80±5° F. and 50±5 percent relative humidity, were the test insects. The test compounds were formulated by diluting the stock suspension with water to give a suspension containing 100 parts of test compound per million parts of final formulation by weight. Paired seel leaves excised from Tendergreen bean plants were dipped in the test formulation until thoroughly wetted, excess liquid being removed by gentle shaking. While the leaves were drying under a hood, wilting was prevented by placing the stems in water. When dry, the paired leaves were separated and each was placed in a 9-centimeter Petri dish lined with moistened filter paper. Four randomly selected larvae were introduced into each dish, and the dishes were closed. The closed dishes were labeled and held at a temperature of 80±5° F. for three days. Although the larvae could easily consume the leaf within 24 to 48 hours, no more food was added. Larvae which were unable to move the length of the body, even upon stimulation, were considered dead. Percent mortality was recorded for various concentration levels.

Fly bait test

Four to six day old adult house flies (*Musca domestica*, L.), reared according to the specifications of the Chemical Specialties Manufacturing Association (Blue Book, McNair-Dorland Co., N.Y. 1954; pages 243–244, 261) under controlled conditions of 80±5° F. and 50±5 percent relative humidity, were the test insects. The flies were immobilized by anesthetizing with carbon dioxide and twenty five immobilized individuals, males and females, were transferred to a cage consisting of a standard food strainer about five inches in diameter which was inverted over blotting paper. The test compounds were formulated by diluting the stock suspension with a 10 percent (by weight) sugar solution to give a suspension containing 500 parts of test compound per million parts of final formulation, by weight. Ten milliliters of the test formulation were added to a soufflé cup containing a one-inch square of an absorbent pad. This bait cup was introduced and centered on the blotting paper under the food strainer prior to admitting the flies. The caged flies were allowed to feed on the bait for twenty-four hours, at a temperature of 80±5° F. and the relative humidity of 50±5 percent. Flies which showed no sign of movement of prodding were considered dead. Percent mortality was recorded for various concentration levels.

Bean aphid foliage spray test

Adults and nymphal stages of the bean aphid (*Aphis fabae* Scop.), reared on potted dwarf nasturtium plants at 65– 70° F. and 50–70 percent relative humidity, constituted the test insects. For testing purposes, the number of aphids per pot was standardized to 100–150 by trimming plants containing excess aphids. The test compounds were formulated by diluting the stock suspension with water to give a suspension containing 100 parts of test compound per million parts of final formulation, by weight. The potted plants (one pot per compound tested), infested with 100–150 aphids, were placed on a revolving turntable and sprayed with 100–110 milliliters of test compound formulation by use of a DeVilbiss spray gun set at 40 p.s.i.g. air pressure. This application, which lasted 30 seconds, was sufficient to wet the plants to run-off. As a control, 100–110 milliliters of a water acetone emulsifier solution containing no test compound were also sprayed on infested plants. After spraying, the pots were placed on their sides on a sheet of white standard mineograph paper which had been previously ruled to facilitate counting. Temperature and humidity in the test room during the 24-hour holding period were 65–70° F. and 50–70 percent, respectively. Aphis which fell onto the paper and were unable to remain standing after being uprighted were considered dead. Aphids remaining on the plants were observed closely for movement and those which were unable to move the length of the body upon stimulation by prodding were considered dead. Percent mortality was recorded for various concentration levels.

Nematocide test

Infective migratory larvae of the root-knot nematode (*Meloidogyne incognita* var. *acrita*), reared in the greenhouse on roots of Coleus plants constituted the test organism. Infected coleus plants were removed from the culture and the roots were chopped very finely. A small amount of these choppings was added to a pint Mason jar containing approximately 180 cubic centimeters of soil. The jar was capped and incubated for one week at room temperature. During the incubation period eggs of the nematode hatch and the larval forms migrate into the soil. The test compounds were formulated by diluting the stock suspension with water to give suspensions containing 1000 parts and 250 parts of test compound per million parts of final formulation. Twenty-five milliliters of each test formulation were added to each of two jars. Thus one pair of jars contained 25 milligrams each and the other pair 6.25 milligrams each of test compound. These amounts are roughly equivalent to 75 pounds and 19 percent respectively. Following the introduction of the test formulation, the pars were capped and the contents thoroughly mixed on a ball mill for five minutes. The jars remained capped at room temperature for 48 hours whereupon the contents were transferred to 3-inch pots. These pots were then sealed with cucumber as an indicator crop and placed in the greenhouse where they were cared for in the usual fashion for approximately three weeks. The cucumber plants were removed from the pots and the soil was washed from the roots. The amount of galling was determined by visual inspection for both concentration levels and the $ED_3$ value (concentration required to permit only light galling) was determined graphically.

The results are set forth in Tables I to VII, below.

TABLE I

Activity against southern armyworm (leaf dip test)

| Compound No.: | $LD_{50}$ (in p.p.m.) |
|---|---|
| 3 | 3 |
| 4 | 20 |
| 5 | 13 |
| 6 | 8 |
| 7 | 55 |
| 8 | 50 |
| 9 | 4 |
| 10 | 30 |
| 17 | 17 |
| 20 | 15 |
| 24 | 52 |
| 26 | 45 |
| 27 | 15 |
| 28 | 15 |
| 29 | 60 |
| 30 | 5 |
| 31 | 6 |
| 32 | 4 |
| 33 | 30 |
| 34 | 16 |

4-formamido - 3,5 - xylyl methylcarbamate (hereinafter referred to as Compound A) which can be considered a structural analog of Compound 3 in that the methoxy group of Compound 3 is replaced by hydrogen, had an $LD_{50}$ rating of 80 in this test, compared to $LD_{50}=3$ for Compound 3.

TABLE II.—ACTIVITY AGAINST SOUTHERN ARMYWORM (SYSTEMIC TEST)

| | Percent mortality [1] | | | |
|---|---|---|---|---|
| | 250 p.p.m. | | 50 p.p.m. | |
| Compound No. | Bean | Cotton | Bean | Cotton |
| 3 | 100 | 100 | 100 | 80 |
| 5 | — | 100 | — | 60 |
| 6 | 100 | 100 | 55 | 100 |
| 9 | 100 | — | 100 | — |
| 10 | 100 | — | 10 | — |
| 20 | — | 100 | — | 60 |
| A | — | 60 | — | 0 |
| B [2] | 0 | — | 0 | — |

[1] Dashes mean that compound was not tested at indicated concentration or plant.
[2] Compound B, included for purposes of comparison, is 4-dimethylamino 3,5-xylyl methylcarbamate.

TABLE III.—RESIDUAL ACTIVITY AGAINST SOUTHERN ARMYWORM

| | Percent mortality at 30 p.p.m. | |
|---|---|---|
| Compound No. | After 0 days | After 7 days |
| 3 | 100 | 100 |
| 6 | 100 | 100 |
| B | 70 | 0 |

TABLE IV

Activity against mexican bean beetle (leaf dip test)

| Compound No.: | $LD_{50}$ (in p.p.m.) |
|---|---|
| 2 | 55 |
| 3 | 40 |
| 4 | 70 |
| 5 | 9 |
| 6 | 35 |

TABLE IV—Continued

| Compound No.: | LD$_{50}$ (in p.p.m.) |
|---|---|
| 7 | 23 |
| 8 | 11 |
| 9 | 45 |
| 10 | 50 |
| 13 | 35 |
| 14 | 75 |
| 16 | 6 |
| 19 | 58 |
| 20 | 15 |
| 21 | 75 |
| 22 | 60 |
| 24 | 6 |
| 29 | 6 |
| 34 | 80 |
| 35 | ~90 |

TABLE V

Activity against house fly (fly bait test)

| Compound No.: | LD$_{50}$ |
|---|---|
| 1 | 25 |
| 2 | 6 |
| 3 | 5 |
| 5 | 12 |
| 6 | 7 |
| 7 | 45 |
| 8 | 40 |
| 9 | 20 |
| 10 | 25 |
| 11 | 25 |
| 12 | 40 |
| 13 | 20 |
| 14 | 70 |
| 15 | 25 |
| 16 | 25 |
| 17 | 36 |
| 18 | 46 |
| 20 | 8 |
| 22 | 15 |
| 23 | 31 |
| 24 | 9 |
| 25 | 32 |
| 29 | 12 |
| 33 | 10 |
| 34 | 70 |
| 35 | 95 |

TABLE VI

Activity against bean aphid (foilage spray test)

| Compound No.: | LD$_{50}$ |
|---|---|
| 12 | 12 |
| 16 | 4 |
| 28 | 4 |
| 29 | 2.5 |
| 35 | 18 |

TABLE VII

Activity against nematodes

| Compound No.: | ED$_3$ (pounds/acre) |
|---|---|
| 1 | ca. 75 |
| 2 | 19 |
| 5 | ca. 38 |
| 6 | 19 |
| 7 | <75 |
| 11 | ca. 19 |
| 16 | ca. 19 |
| 19 | ca. 75 |
| 21 | 19 |
| 22 | 19 |
| 32 | ca. 75 |
| 34 | ca. 75 |

It can be seen from Tables I and VI that the compounds of this invention possess remarkable insecticidal activity. Particularly noteworthy is their extremely high toxicity at low dosages, their systemic activity (Table II), and their residual effectiveness (Table III). In these respects, our compounds are superior to previously known materials. For example, comparative tests with 4-formamido-3,5-xylyl methylcarbamate (Compound A), which is said to have insecticidal activity in U.S. Patent 3,037,993 to Shulgin, showed that 80 parts per million of the known compound were required to kill fifty percent of a Southern armyworm population whereas the LD$_{50}$ for the corresponding compound of this invention (Compound 3) was 3 parts per million (Table I). Compound A provided no systemic control at 50 p.p.m. and little control at 250 p.p.m. relative to the present compounds (Table II). Similarly, 4-dimethylamino-3,5-xylyl carbamate (Compound B) which is disclosed as processing high insecticidal activity at very low concentrations in the Shulgin patents U.S. 3,060,225 and 3,084,098, was found to be less effective than the present compounds in systemic activity and residual action (Tables II and III).

It is therefore evident that the carbanilate moiety (—NR$_2$COXR$_1$) which characterizes the compounds of this invention is essential for high activity. Although R$_1$=methyl results in preferred compounds, the size of R$_1$ appears not to be a limiting factor inasmuch as relatively large substituents, such as nitrophenyl, phenylthio, and dichlorobenzyl, yielded compounds of high activity. In addition, the data presented in Tables I to VI show that compounds in which the total number of carbon atoms in the ring substituents (R$_3$, R$_4$, and R$_5$) does not exceed 4 are generally more active and, hence, preferred.

It will be understood that the insect species employed in the above tests are merely representative of a wide variety of pests that can be controlled by use of our compounds. For example, the hornworm, cabbage worm, cornearworm, and Colorado potato beetle can also be combated with our compounds.

In addition to their insecticidal activity, noteworthy nematocidal activity was displayed by our compounds as shown by the data presented in Table VII.

The compounds contemplated in this invention may be applied as insecticides and nematocides according to methods known to those skilled in the art. Pesticidal compositions containing the compounds as the active toxicant will usually comprise a carrier and/or diluent, either liquid or solid.

Suitable liquid diluents or carriers include water, petroleum distillates, or other liquid carriers with or without surface active agents. Liquid concentrates may be prepared by dissolving one of these compounds with a nonphytotoxic solvent such as acetone, xylene, or nitrobenzene and dispersing the toxicants in water with the aid of suitable surface active emulsifying and dispersing agents.

The choice of dispersing and emulsifying agents and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fullers earth, and the like. In the formulation of the wettable powders the aforementioned dispersing agents as well as lignosulfonates can be included.

The required amount of the toxicants contemplated herein may be applied per acre treated in from 1 to 200 gallons or more of liquid carrier and/or diluent or in from about 5 to 500 pounds of inert solid carrier and/or diluent. The concentration in the liquid concentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre.

The pesticides contemplated herein prevent attack by insects and nematocides upon plants or other material to which the pesticides are applied, and they have high residual toxicity. With respect to plants they have a high margin of safety in that when used in sufficient amount to kill or repel the insects, they do not burn or injure the plant, and they resist weathering which includes wash-off caused by rain, decomposition by ultra-violet light, oxidation, or hydrolysis in the presence of moisture or, at least, such decomposition, oxidation, and hydrolysis as would materially decrease the desirable insecticidal characteristics of the toxicants or impart undesirable characteristics, for instance, phytotoxicity, to the toxicants. The toxicants are so chemically inert that they are now compatible with substantially any other constituents of the spray schedule, and they may be used in the soil, upon the seeds, or the roots of plants without injuring either the seeds or roots of plants, yet by inhibition or root uptake, they will kill the pests feeding thereon.

What is claimed is:

1. A 4-(methylcarbamoyloxy)carbanilate compound of the formula:

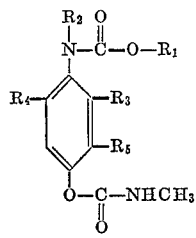

wherein $R_1$ is lower alkyl, lower alkoxyalkyl, lower chloroalkyl, lower bromoalkyl, lower nitroalkyl, lower alkenyl, aryl, alkaryl, alkoxyaryl, chloroaryl, bromoaryl, nitroaryl, aralkyl or alkarylalkyl, alkoxyarylalkyl, chloroarylalkyl, bromoarylalkyl, or nitroarylalkyl; $R_2$ is hydrogen or alkyl containing not more than 4 carbon atoms; $R_3$ and $R_4$ individually are hydrogen or lower alkyl; $R_5$ is hydrogen, halogen, lower alkyl, lower alkoxy, or lower alkylthio; $R_3$ and $R_5$ taken together are alkylene of from 3 to 5 carbon atoms; provided that the total number of carbon atoms in $R_3$, $R_4$ and $R_5$ does not exceed 7.

2. A compound as claimed in claim 1 wherein $R_1$ is methyl or ethyl; $R_2$ and $R_5$ are hydrogen; and $R_3$ and $R_4$ are hydrogen or lower alkyl where the total number of carbon atoms in $R_3$ and $R_4$ is less than 5.

3. A compound as claimed in claim 1 wherein said carbanilate compound is methyl 2-isopropyl-4-(methylcarbamoyloxy)carbanilate.

4. A compound as claimed in claim 1 wherein said carbanilate compound is methyl 2,6-dimethyl-4-(methylcarbamoyloxy)carbanilate.

5. A compound as claimed in claim 1 wherein said carbanilate compound is methyl 2-ethyl-4-(methylcarbamoyloxy)carbanilate.

6. A compound as claimed in claim 1 wherein said carbanilate compound is methyl 2-tert.butyl-4-(methylcarbamoyloxy)carbanilate.

7. A compound as claimed in claim 1 wherein said carbanilate compound is ethyl 2,6-dimethyl-4-(methylcarbamoyloxy)carbanilate.

8. A compound as claimed in claim 1 wherein said carbanilate compound is methyl 2,3-tetramethylene-4-(methylcarbamoyloxy)carbanilate.

9. A compound as claimed in claim 1 wherein $R_1$ is aryl, aralkyl, or alkaryl, alkoxyaryl, chloroaryl, bromoaryl, nitroaryl or alkarylalkyl, alkoxyarylalkyl, chloroarylalkyl, bromoarylalkyl, or nitroarylalkyl; $R_2$ and $R_5$ are hydrogen; and $R_3$ and $R_4$ are hydrogen or lower alkyl where the total number of carbon atoms in $R_3$ and $R_4$ is less than 5.

10. A compound as claimed in claim 3 wherein $R_1$ is phenyl, lower alkylphenyl, lower alkoxyphenyl, lower chlorophenyl, lower bromophenyl or lower nitrophenyl.

References Cited

UNITED STATES PATENTS 2,777,871  1/1957  Strain _____ 260—471 XR

FOREIGN PATENTS 1,475,241  2/1967  France.

CHARLES B. PARKER, Primary Examiner.

D. R. PHILLIPS, Assistant Examiner.

U.S. Cl. X.R.

260—455, 575; 424—300